US012759920B2

(12) United States Patent
Hong et al.

(10) Patent No.: US 12,759,920 B2
(45) Date of Patent: Oct. 13, 2026

(54) SYSTEM FOR GRADUALLY PULVERIZING AND DRYING WATER-CONTAINING MATERIALS

(71) Applicants: University of Science and Technology Beijing, Beijing (CN); Suzhou Weihang Environmental Technology Co., LTD., Suzhou (CN)

(72) Inventors: Chen Hong, Beijing (CN); Yanxiao Si, Beijing (CN); Jirong Li, Beijing (CN); Yang Wang, Beijing (CN)

(73) Assignees: University of Science and Technology Beijing, Beijing (CN); Suzhou Weihang Environmental Technology Co., LTD., Suzhou (CN)

( * ) Notice: Subject to any disclaimer, the term of this patent is extended or adjusted under 35 U.S.C. 154(b) by 379 days.

(21) Appl. No.: 18/581,675

(22) Filed: Feb. 20, 2024

(65) Prior Publication Data

US 2024/0286143 A1 Aug. 29, 2024

(30) Foreign Application Priority Data

Feb. 27, 2023 (CN) ......................... 202310165912.3

(51) Int. Cl.
*B02C 13/06* (2006.01)
*B02C 23/10* (2006.01)
(Continued)

(52) U.S. Cl.
CPC .............. *C02F 11/13* (2019.01); *B02C 13/06* (2013.01); *B02C 23/10* (2013.01); *C02F 11/121* (2013.01)

(58) Field of Classification Search
CPC ........... C02F 11/13; C02F 11/00; C02F 11/12; C02F 11/121; C02F 11/127; B02C 18/16;
(Continued)

(56) References Cited

U.S. PATENT DOCUMENTS 4,076,177 A * 2/1978 Hirayama ........... B02C 13/2804 241/73
5,426,866 A * 6/1995 Rumocki .................. F26B 7/00 210/609

(Continued)

FOREIGN PATENT DOCUMENTS

| | | | |
|---|---|---|---|
| CN | 2222010 | Y | 3/1996 |
| CN | 101913749 | A | 12/2010 |
| CN | 105000771 | A | 10/2015 |
| CN | 208166828 | U | 11/2018 |
| CN | 208998093 | U | 6/2019 |
| CN | 209872739 | U | 12/2019 |
| CN | 211476372 | U | 9/2020 |

(Continued)

OTHER PUBLICATIONS

English translation of JP2563079B2, Dec. 11, 1996. (Year: 1996).*
Escapenet Machine translation of KR101358885B1, Feb. 5, 2014. (Year: 2014).*

*Primary Examiner* — Joseph W Drodge
(74) *Attorney, Agent, or Firm* — Sand, Sebolt & Wernow Co., LPA

(57) ABSTRACT

Solid-liquid separation equipment includes a pulverizing and drying device. The pulverizing and drying device includes a pulverizing device and a drying device connected with one another. The pulverizing device has a pulverizing shell, an inlet, a main shaft and impellers, and the main shaft and the impellers are arranged in the pulverizing shell. The impellers are configured to rotate around the main shaft. The inlet forms a sidewall of the pulverizing shell and is intersected with the main shaft or an extension line of the main shaft. A gap is defined between an outer peripheral end of the impeller and the wall of the pulverizing shell. The sludge is efficiently and deeply dried in a condition with no phase change. The sludge is graded, pulverized and dried. During the pulverizing and drying process, the water is liquefied and centrifugally separated, and the water is not completely phase-transformed and removed.

17 Claims, 6 Drawing Sheets

(51) Int. Cl.
*C02F 11/121* (2019.01)
*C02F 11/13* (2019.01)

(58) Field of Classification Search
CPC ......... B02C 23/16; B02C 13/06; B02C 13/28; B02C 13/286; B02C 13/30; B02C 2013/28609; B02C 13/10; B02C 13/12; B02C 13/18; B02C 13/2804; B02C 21/00; B02C 23/08; B02C 23/10; B02C 2013/2808; Y02W 10/37; B01D 50/20; B01D 53/005; B01D 53/26
See application file for complete search history.

(56) References Cited

U.S. PATENT DOCUMENTS

| | | | | |
|---|---|---|---|---|
| 6,375,103 B1 * | 4/2002 | Huang | ................ | B02C 13/1814<br>241/80 |
| 2011/0186664 A1 * | 8/2011 | Lucas | ..................... | F26B 25/08<br>241/38 |

FOREIGN PATENT DOCUMENTS

| | | | | | |
|---|---|---|---|---|---|
| CN | 213790582 U | | 7/2021 | | |
| CN | 217312846 U | | 8/2022 | | |
| JP | 2563079 B2 | * | 12/1996 | ............ | C02F 11/127 |
| KR | 101358885 B1 | * | 2/2014 | ............... | B09B 3/32 |

* cited by examiner

SYSTEM FOR GRADUALLY PULVERIZING AND DRYING WATER-CONTAINING MATERIALS

REFERENCE TO RELATED APPLICATIONS

The application is based on and claims the priority of Chinese Patent Application No. 202310165912.3 filed with the CNIPA on Feb. 27, 2023, and the entire disclosure of the priority is contained herein by reference.

TECHNICAL FIELD

The present application relates to a solid-liquid separation equipment, in particular to a Gradually Pulverizing and drying device for deeply drying water-containing materials, and belongs to the field of solid-liquid separation.

BACKGROUND ART

Pressure filtration is as a general method for dewatering materials with high water content (such as surplus sludge). After materials are dewatered by a pressure filtration, water contained in the filtered residue cannot be completely removed, that is, a considerable amount of water still remains in the materials being filtered. The water remaining in the materials includes interstitial water, adsorption water, capillary water, etc., which need to be removed by deeply drying. With respect to deeply drying water-containing materials, evaporation is the most common way to remove water, that is, water is evaporated into water vapor by absorbing heat, and then water is separated from the materials. Evaporation technology for removing water mainly includes drying by heating, drying by heat pump, drying by solar energy, drying by natural ventilation, etc. These drying methods have obvious deficiencies in terms of energy consumption or efficiency.

In being evaporated, water is subject to a phase change process of "heating-vaporization-condensation". The temperature of water rises by absorbing heat of 4.2 KJ/kg·° C., and liquid water with a temperature of 100° C. is vaporized by absorbing heat of 2260 KJ/kg at a standard atmospheric pressure. The absorbed heat is released as low-grade waste heat in condensing water, and it is difficult to be efficiently recycling the waste heat. In drying by solar energy and drying by natural ventilation, the heat comes from nature, there is no need of extra energy supply, so these drying methods have the characteristics of low energy consumption. However, energy sources, such as solar energy and natural wind, can provide limited heat energy, and the drying speed is much lower than that of drying by heating and drying by heat pump, resulting in a very slow drying speed and low efficiency.

SUMMARY OF THE INVENTION

An object of the present application is to efficiently and deeply dry sludge at ambient temperature. The sludge is graded and pulverized and dried. During the pulverizing and drying process, the water is liquefied and centrifugally separated, and the water is not completely phase-transformed and removed.

The deep drying of sludge in this application can also be applied to high-efficiency and deep drying of other water-containing materials. A device for drying sludge, including a pulverizing and drying device; the pulverizing and drying device includes a pulverizing device and a drying device, and the pulverizing device and the drying device are connected to each other; wherein, the pulverizing device includes a pulverizing shell, a pulverizing inlet, a pulverizing main shaft and a pulverizing impeller, the pulverizing main shaft and the pulverizing impeller are arranged in the pulverizing shell, and the pulverizing impeller can rotate around the pulverizing main shaft; The wall intersects the pulverizing main shaft or the extension line of the pulverizing main shaft, and there is a gap between the outer peripheral end of the pulverizing impeller and the wall of the pulverizing shell.

After the crushed material (such as sludge) enters the pulverizing shell through the pulverizing inlet, under the action of the centrifugal force generated by the rotation of the pulverizing impeller, the crushed material is driven to move toward the sidewall of the pulverizing shell and collide with it, and the crushed material is pulverized into finer powder. The water in the material can be fully exposed, and the bonding strength between ultrafine materials is weakened, which facilitates the separation of water and solid matter in the subsequent drying process, and improves the efficiency of sludge drying.

DETAILED DESCRIPTION

Figure 1:
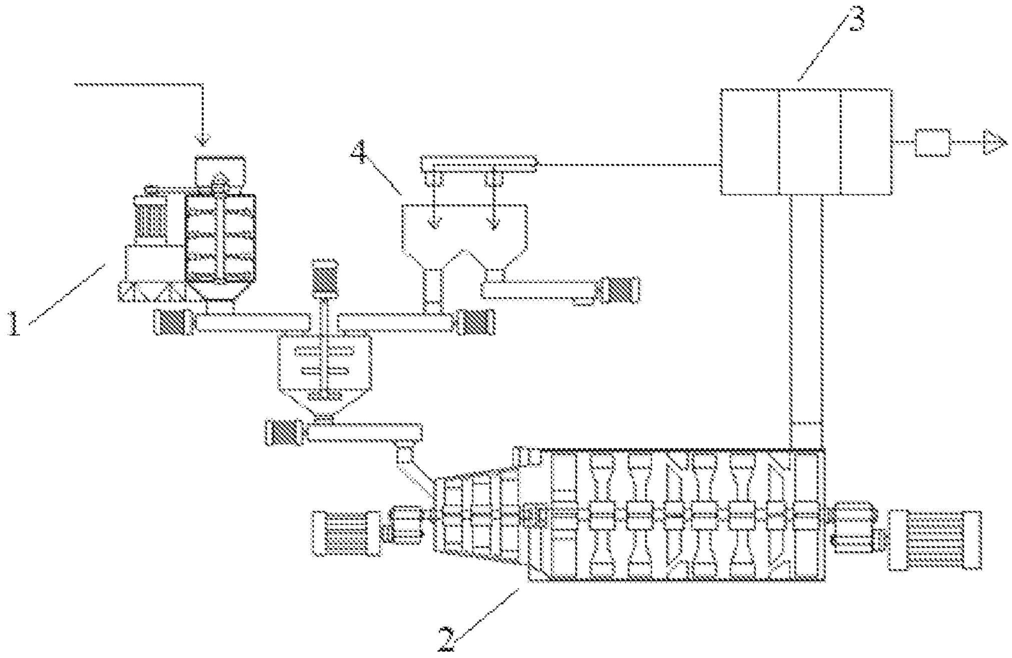
FIG. 1 is a structure diagram of an embodiment of a solid-liquid separation equipment of the present application.

The solid-liquid separation equipment of the present application is further described in detail below. The protection scope of the present application is not limited, and the protection scope is defined by the claims. The disclosed details are used for thoroughly understanding the various disclosed embodiments. However, one skilled in the art can know that embodiments may be implemented without one or more of these details, and with other materials and the like.

Unless the context requires, in the specification and claims, the term "comprising" or "containing" should be interpreted as an open-end and inclusive meaning, that is, "including, but not limited to".

The "embodiment", "an embodiment", "another embodiment" or "some embodiments" mentioned in the specification refers to that the specific features, structures or characteristics described in the embodiment are included in at least one embodiment. Thus, "an embodiment," "an embodiment," "another embodiment," or "some embodiments" are not necessarily all included in the same embodiment. Furthermore, the specific features, structures or characteristics may be combined in any manner in one or more embodiments. Each feature disclosed in the specification may be replaced by any alternative feature that can have the same, equivalent or similar function. Therefore, unless otherwise specified, the disclosed features are only general examples of equivalent or similar features.

The orientation terms such as up, down, left, right, front and rear in the application are used based on the positions shown in the figures. If the figures are different, the corresponding positions may also change accordingly, so it should not be understood as limiting the scope of the claims.

A sludge drying equipment of the present application can be used as a solid-liquid separation equipment in other fields, especially in the treatment of water-containing materials such as coal slime and medicinal residue. The above-mentioned materials are sufficiently crushable at a certain moisture content, and it is difficult or a higher energy consumption to perform deep solid-liquid separation by using the conventional methods. The solid-liquid separation equipment of the application can be used for deeply drying. Specifically, at ambient temperature, the solid-liquid separation equipment of the present application can deeply dry the water-containing materials without providing an additional heat source.

The basic goal of drying sludge is to remove water, regardless of the way of removing water. It is not the only drying way to remove water by the phase change from liquid water into water vapor. The application provides a system for gradually pulverizing and efficiently drying the water-containing materials (such as sludge), which is a deep drying device by incomplete phase change of water. Through the two mechanisms of removing liquid water by centrifugal separation and water evaporation without additional energy consumption, the water-containing materials (such as sludge) is deeply and efficiently dried at room temperature, and there are effects of low energy consumption and high efficiency.

A sludge drying equipment comprises a pulverizing and drying device. The pulverizing and drying device comprises a pulverizing device and a drying device, and the pulverizing device and the drying device are connected with each other. The pulverizing device comprises a pulverizing shell, a pulverizing inlet, a pulverizing main shaft and pulverizing impellers, the pulverizing main shaft and the pulverizing impellers are arranged in the pulverizing shell, and the pulverizing impellers is capable of rotating around the pulverizing main shaft. The pulverizing inlet is formed an end of the pulverizing shell, and the end having the pulverizing inlet is intersected with the pulverizing main shaft or an extension line of the pulverizing main shaft. There is a gap between an outer peripheral of the pulverizing impeller and a sidewall of the pulverizing shell.

The sludge drying equipment can also be a solid-liquid separation equipment for other water-containing materials. A solid-liquid separation equipment comprises a pulverizing and drying device. The pulverizing and drying device comprises a pulverizing device and a drying device, and the pulverizing device and the drying device are connected with each other. The pulverizing device comprises a pulverizing shell, a pulverizing inlet, a pulverizing main shaft and pulverizing impellers, the pulverizing main shaft and the pulverizing impellers are arranged in the pulverizing shell, and the pulverizing impellers are capable of rotating around the pulverizing main shaft. The pulverizing inlet is formed an end of the pulverizing shell, and the end having the pulverizing inlet is intersected with the pulverizing main shaft or an extension line of the pulverizing main shaft. There is a gap between an outer peripheral of the pulverizing impeller and the sidewall of the pulverizing shell.

The pulverizing impeller comprises pulverizing blades, and the pulverizing blades can be directly fixed on the pulverizing main shaft. Alternatively, the pulverizing blades can be fixed on the pulverizing main shaft by other connection manners.

Pulverizing Device

In some embodiments, in a direction of the pulverizing main shaft, cross-sections of the pulverizing shell perpendicular to the pulverizing main shaft are variable, and the cross-sectional area of the end with the inlet is smallest.

Preferably, in the direction of the pulverizing main shaft, the cross-sections of the pulverizing shell perpendicular to the pulverizing main shaft are gradually increased from the end with the inlet.

More preferably, the cross-section of the pulverizing shell perpendicular to the pulverizing main shaft is in a shape of circular. That is, the pulverizing shell is a truncated cone.

In some embodiments, the pulverizing shell is in a shape of a truncated cone, and annular ribs are provided on an inner sidewall of the pulverizing shell. In the direction of the pulverizing main shaft, the annular ribs are provided on the inner sidewall of the pulverizing shell between adjacent pulverizing impellers.

In the direction of the pulverizing main shaft, one annular rib can be arranged between every two pulverizing impellers. It is also possible to partition two annular ribs by pulverizing impellers with the number of 1 to n, that is, more than two impellers are arranged between two annular ribs.

The cross-section of the annular rib can be a shape of triangular, trapezoidal, or arc, or other irregular shapes.

In some embodiments, a maximum length of the annular rib in a radial direction of the pulverizing shell is greater than a distance between the pulverizing blade and the inner sidewall of the pulverizing shell.

By the above arrangements, the annular ribs play the role of partitioning the pulverizing area in the pulverizing shell, so the pulverizing time is increased, and the particle size of the material after pulverizing is smaller.

In some embodiment, the pulverizing main shaft within the pulverizing shell is parallel to the horizontal direction. In a vertical direction, the inlet is located above the pulverizing main shaft.

Through the arrangement of the cross-sections of the pulverizing shell, the cross-section perpendicular to the pulverizing main shaft and near the pulverizing inlet is small, and accordingly a diameter of the pulverizing impeller is also small, so a linear velocity caused by the rotation of the impeller is small, and the small force is taken on the materials fed from the pulverizing inlet to ensure that the material is smoothly fed in the pulverizing shell. With the increase of the cross-sections of the pulverizing shell, accordingly the diameters of the pulverizing impellers are also enlarged, so a linear velocity caused by the rotation of the pulverizing impeller become larger, and it is increased in the collision degree between the materials and the inner sidewall of the pulverizing shell, to improve the pulverizing efficiency.

In the direction of the pulverizing main shaft, a plurality of pulverizing impellers are provided. Each of the pulverizing impellers comprises 2-8 pulverizing blades, and the pulverizing blades are arranged evenly. Preferably, the pulverizing blades of one pulverizing impeller are evenly arranged around the pulverizing main shaft.

In some embodiments, the pulverizing blade is in a shape of strip, and an end of the pulverizing blade away from the pulverizing main shaft is inclined in the horizontal direction.

The inclination direction of the end of the pulverizing blade is basically the same as the inclination of the inner sidewall of the pulverizing shell. By the arrangement, the distance between the end of the pulverizing blade and the inner sidewall of the pulverizing shell with a truncated cone can be basically kept the same in all positions, or the distance can be changed within a small range.

Preferably, the distance between the end of the pulverizing blade and the inner sidewall of the pulverizing shell is in a range of 0.5 cm-5 cm.

In some embodiment, the pulverizing blade is a shape of strip, and an included angle between the pulverizing blade and an axis of the pulverizing main shaft is in a range from 0° to 10°.

The pulverizing blade is slightly deviated from the axial direction, so the pulverizing blade can push the materials to move toward a direction away from the inlet.

The pulverizing blade with a shape of strip is fixed on and vertical to the pulverizing main shaft, and a direction from a first side to a second side of the pulverizing blade perpendicular to the pulverizing main shaft is the direction of the movement of materials. The second side is deviated by an included angle from an axis where the first side is located, and toward a direction opposite to the rotation of the pulverizing blade; and the included angle is in a range from 0° to 10°.

Preferably, the included angles between the pulverizing blades of a same cross-section in the pulverizing shell and the axial direction of the pulverizing main shaft are the same.

As a preferred solution, in the present application the pulverizing shell with a shape of a truncated cone comprises a first end, a second end, and a sidewall. An area of the first end is smaller than that of the second end. The pulverizing main shaft is arranged along a center line of the pulverizing shell with a shape of a truncated cone, and the pulverizing inlet is formed on the first end of the pulverizing shell and located above the pulverizing main shaft.

During pulverizing, the materials are fed in the pulverizing device from the first end, and are discharged from the second end or the sidewall close to the second end.

In the pulverizing device, the pulverizing blades rotate at high speed to pulverize the particles to be dried into ultrafine powders. The interstitial water, adsorbed water, and capillary water in the ultrafine powders are fully exposed and migrate to the surface of the ultrafine powders. The binding state of water and ultrafine powders changes, and the binding strength is weakened, they are become surface water with weak binding strength with ultrafine powder.

The pulverizing device can be used in conjunction with any drying device disclosed in prior art. Preferably, the following drying device is used in the application.

Structure of the Drying Device

The drying device comprises a drying shell, an air inlet, a discharge port, a drying main shaft and a drying impeller. The drying main shaft and the drying impeller are arranged in the drying shell, and the drying impeller is capable of rotating around the drying main shaft. The air inlet and the discharge port are formed on a sidewall of the drying shell respectively.

The air inlet and the discharge port are respectively arranged on the sidewall of the drying shell close to two ends of the drying main shaft.

In a preferred solution, the drying shell is in a shape of a cylinder. That is, the cross-sections of the drying shell are circulars with equal diameter. The drying shell includes a first end and a second end, the first end is close to the air inlet, and the second end is close to the discharge port.

In some embodiment, guiding protrusions are provided on an inner sidewall of the drying shell. The drying main shaft is substantially parallel to the horizontal direction, and the guiding protrusions are provided on the inner sidewall of the drying shell not lower than the drying main shaft in a vertical direction.

Each of the guiding protrusions are extended in a circumferential direction of the inner sidewall of the drying shell. On projection plane in a horizontal direction, an included angle between the guiding protrusions and the drying main shaft is in a range of 60-88°. (direction: from the first end to the second end of the drying shell)

In the direction of rotation of the drying impeller, the drying blade of the drying impeller first passes through a first end of the guiding protrusion, and then passes through a second end of the guiding protrusion, and a distance between the first end of the guiding protrusion and the sidewall with the air inlet is less than a distance between the second end of the guiding protrusion and the sidewall with the air inlet.

In some embodiment, the guiding protrusions are arranged on the inner sidewall of the drying shell above the drying main shaft, and at least on the inner sidewall in the first half in a forward direction.

The cross-section the guiding protrusion can be trapezoidal, triangular, or arc shape.

In some embodiment, a partition portion is provided on the inner sidewall the drying shell in the circumferential direction. In an extending direction of the drying main shaft, the partition portion is arranged on the inner sidewall of the drying shell between adjacent drying impellers.

In the circumferential direction of the drying shell, the partition portion is at least located on the inner sidewall being greater than ⅓ of the circumference of the drying shell. Preferably, the partition portions are arranged symmetrically with respect to a vertical plane along the drying main shaft.

In some embodiment, a guiding impeller is provided on the same cross-section as the partition portion. The partition portion comprises an inclined surface, and the inclined surface faces the first end of the drying shell. In other words, the cross-section of the partition portion is a polygon with an inclined side facing the first end of the drying shell, for example, a trapezoid or a right triangle. In the radial direction from the center of the drying shell to the inner sidewall, distances between the inclined side of the partition portion and the first end of the drying shell are gradually increased.

On the cross-section where the partition portion is located, a guiding impeller is arranged. The guiding impeller comprises more than three guiding blades.

In some embodiment, the guiding blade is in a shape of strip. A first end of the guiding blade is fixed in the drying main shaft, the guiding blade is extended in the radial direction of the drying shell, and a second end opposite to the first end is inclined.

An inclination direction of the second end of the guiding blade is consistent with that of the inclined surface of the partition portion. By the arrangement, distances between the end of the guiding blade and the inclined surface of the partition portion can be basically same, or change within a small range.

Preferably, the distance between the second end of the guiding blade and the inclined surface of the partition portion is in a range of 1.0 cm-8.0 cm.

In some embodiment, the guiding blade is a shape of strip, and the included angle between the guiding blade and an axial direction of the drying main shaft is in a range from 0° to 30°.

The guiding blade with a shape of strip is fixed on or vertical to the drying main shaft, and a direction from a first side to a second side of the drying blade perpendicular to the drying main shaft is the direction of the movement of materials. The second side is deviated by an included angle from an axis where the first side is located, and toward a direction opposite to the rotation of the drying blade; and the included angle is in a range from 0° to 30°.

One or more partition portion may be arranged in the axial direction within the drying shell. One or more drying impellers are arranged between adjacent partition portions.

Through the arrangements of the partition portion and the guiding impeller, one or more drying impellers, one partition portion, one guiding impeller and the inner sidewall of the drying shell in the space together constitute a drying treatment unit. One or more drying treatment units are included in the drying device. The materials in the drying device are repeatedly hit by the inner sidewall with high frequency, and the water is separated from the materials.

Each drying impeller comprises a plurality of drying blades.

Each of the drying blades is in a shape of strip.

In some embodiment, the discharge port is arranged on the sidewall of the drying shell near the second end. A push-flow impeller is attached on the drying main shaft, and the rotation plane of the push-flow impeller is at least partially coincident with the discharge port in a direction perpendicular to the drying main shaft.

In a preferred solution, the push-flow impeller comprises push-flow blades with a shape of strip, and a length of the push-flow blade in the axial direction is less than or equal to a length of the discharge port.

The dried material is discharged out of the drying device through the discharge port by the push-flow impeller in the tangential direction of rotation. The push-flow blade on the push-flow impeller is arranged in the axial direction of the drying main shaft, and the included angle between the push-flow blade and the axial direction is 0° in a straight line with the axial direction.

In some embodiment, an extension with a shape of cylinder is provided on an outer periphery of the discharge port, and the extension is arranged along a tangential direction of the drying shell with a shape of cylinder.

The discharge port can be formed at any position on the sidewall of the drying shell in the circumferential direction near the second end.

The drying device and the pulverizing device of the present application may be arranged integrally or separately.

In an embodiment, the pulverizing device and the drying device are integrated as a whole. The second end of the pulverizing device is open, the first end of the drying device is open, and the second end of the pulverizing device is connected with the first end of the drying device, so that the pulverized material enters in the drying device in the axial direction of the drying main shaft of the pulverizing device and the drying main shaft of the drying device.

Preferably, the center lines of the pulverizing main shaft of the pulverizing device and the drying main shaft of the drying device are on the same straight line, and two main shafts are connected with each other by a shaft seat. The pulverizing main shaft of the pulverizing device and the drying main shaft of the drying device can rotate independently.

In another embodiment, the pulverizing device and the drying device are independent from each other.

The second end of the pulverizing device is closed, and a first discharge port is formed on the sidewall of the pulverizing shell near the second end. The first discharge port is communicated with an interior of the pulverizing shell by a pipe. The first discharge port is tangential to the sidewall of the drying shell and extended in the rotation direction of the pulverizing blade.

The first end of the drying device is closed, and a drying inlet is formed on the sidewall of the drying shell near the first end. The drying inlet is communicated with an interior of the drying shell by a pipe. The drying inlet is tangential to the sidewall of the drying shell and extended in a direction opposite to the rotation direction of the drying blade.

The first discharge port of the pulverizing device is connected with the drying inlet of the drying device through a pipe.

The rotation direction of the pulverizing blades is consistent with the extension direction of the delivery pipe, so the pulverized materials can be driven to be discharged out of the pulverizing shell by the rotation of the pulverizing blades. The rotation direction of the drying blade is opposite to the extension direction of the delivery pipe, so the pulverized materials can be driven to be brought into the drying shell by the rotation of the drying blades.

In the drying device of the present application, the ultrafine powders are impacted and pushed by the drying blades to perform high-speed centrifugal motion in the drying device under the action of high-speed centrifugal stirring. Under the action of the high-intensity centrifugal stirring, water is separated from the ultrafine powders. In addition, the ultrafine powders repeatedly collides with the drying blades and the inner sidewall of the drying shell with a shape of cylinder at high frequency in the drying device, and the movement modes of the ultrafine powders is switched in high-frequency among accelerating movement at high speed→stopping movement by the collision and being subject to force→accelerating movement at high speed again, so water on the ultrafine powders is efficiently removed due to the instantaneous high acceleration.

Under the action of the push-flow impeller and the guiding protrusions, the ultrafine powders moves from the front end to the rear end of the drying device. The ultrafine powders with a low moisture content is more likely to cross the partition portion and reach the rear end, while the materials with a high moisture content is retained until the moisture content of the materials drops to a predetermined range. By setting the height of the partition portion, the angle of inclined side of the cross section of the partition portion, and the range (⅓ circle~full circle) of the partition portion, the drying effect can be adjusted. In the drying device of the present application, the high-speed rotation of the drying blades, the guiding blades, and the push-flow blades generates a negative pressure to induce wind into the drying device. The external natural air is induced into the drying device from the air inlet at the first end of the drying shell. The natural air is mixed with ultrafine powders in the drying device, to generate convective drying. The moisture in the ultrafine powders absorbs the heat in the natural air and is evaporated into water vapor, further improving the drying effect.

The drying device of the present application can be combined with the above pulverizing device, or in combination with other pulverizing device in the prior art, for pulverizing and drying materials.

The materials are crushed before entering the pulverizing and drying device, so the large-block materials are subject to being crushed. The pulverizing and drying device of the present application can be in combination with the crushing device and the gas-solid separation device of the prior art.

After drying, gas is separated from solids of the materials (such as dry sludge) by the gas-solid separation device, so the dust content discharged into the atmosphere is significantly reduced.

The gas-solid separation device includes a cyclone separator and a bag separator, which are connected with each other.

In the application, the cyclone separator and the bag separator can employ any structure disclosed in the prior art.

In another aspect, a method for drying water-containing materials comprises:

1) crushing water-containing materials into particles to be dried with a particle size less than or equal to 5 mm;
2) feeding the particles to be dried into a pulverizing device, and the particles to be dried being crashed and pushed to perform centrifugal motion under a rotation of pulverizing blades and pulverized into ultrafine powders in the pulverizing device;
3) feeding the ultrafine powders into a drying device, and drying the ultrafine powders to separate water to obtain dried powders under the action of dry air;
4) feeding the dried powders into a gas-solid separation device for separating gas from solid powders;
5) discharging the separated solid powders from a solid-liquid separation system after meeting a drying requirement; or mixing the separated solid powders with the particles to be dried to perform step 2)-4), if the separated solid powders does not meet the drying requirement, and discharging the separated solid powders from a solid-liquid separation system after meeting a drying requirement.

The water-containing materials can be sludge.

The particle size of ultrafine powders is in a range of 20-250 μm.

In some embodiment, in the pulverizing device, a rotating speed of the pulverizing blade is in a range of 1000-3000 r/min.

In the drying device, a rotation speed of the drying blade is in a range of 1500-3000 r/min.

A linear velocity at the ends of the drying blades is in a range of 15-150 m/s, or ≥15 m/s.

In step 1), a rotation speed of a plate hammer is in a range of 200-1000 r/min.

The method for drying sludge of the present application can also be used for solid-liquid separation of other water-containing materials.

The above rotation speeds can be adjusted appropriately according to the different properties of materials and the requirements of drying degree.

The above solid-liquid separation method for water-containing materials can be carried out in the solid-liquid separation system disclosed in the prior art. It is preferably carried out in the above mentioned solid-liquid separation equipment in this application.

For surplus sludge with a water content of 35%-55%, the water content of the sludge powder being dried is in a range of 10%-30% after deeply drying in the liquid-solid separation equipment of the present application. During the whole pulverizing and drying process, the sludge can be dried efficiently and deeply at ambient temperature without additional heat source.

The liquid-solid separation equipment of the present application is further described below in conjunction with the accompanying drawings.

With reference to an embodiment of a liquid-solid separation equipment as shown in FIG. 1, the crushing device 1 is connected with the inlet of the pulverizing and drying device 2 through the homogenizer 4-6 of a finished product distribution-remixing unit 4, a discharge port of the pulverizing and drying device 2 is connected to a gas-solid separation device 3, and the gas-solid separation device 3 is connected to the distribution cavity 4-2 of the finished product distribution-remixing unit 4. Materials can be circularly dried until the materials meets a drying requirement.

In one embodiment, the crushing device has a vertical structure. The materials with large blocks is crushed into materials with a particle size less than or equal to 10 mm. The crushed materials enters the pulverizing and drying device 2 to be pulverized and dried.

The pulverizing and drying device 2 is composed of a pulverizing device 2-1 and a drying device 2-2.

The pulverizing device 2-1 and the drying device 2-2 can be integrated as a whole; alternatively they can also be two independent devices connected with each other by a pipe.

Figure 2:
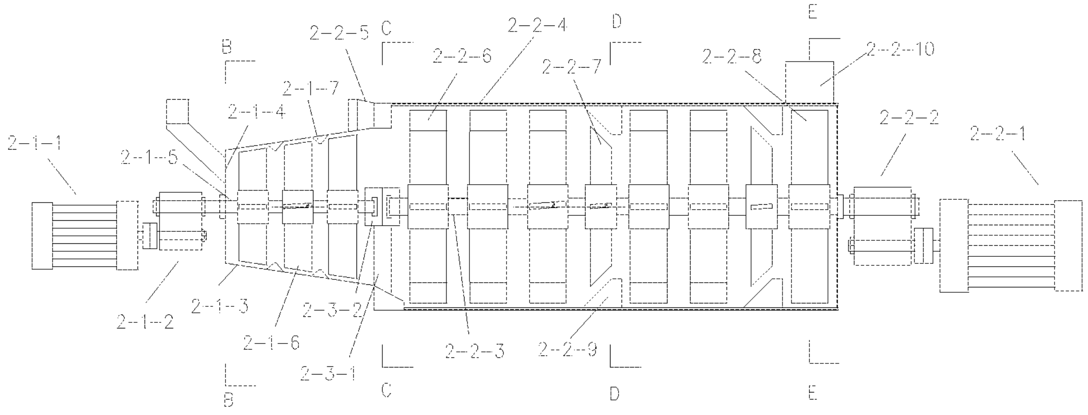
FIG. 2 is a structural diagram of an embodiment of a pulverizing and drying device of the present application.
Figure 3:
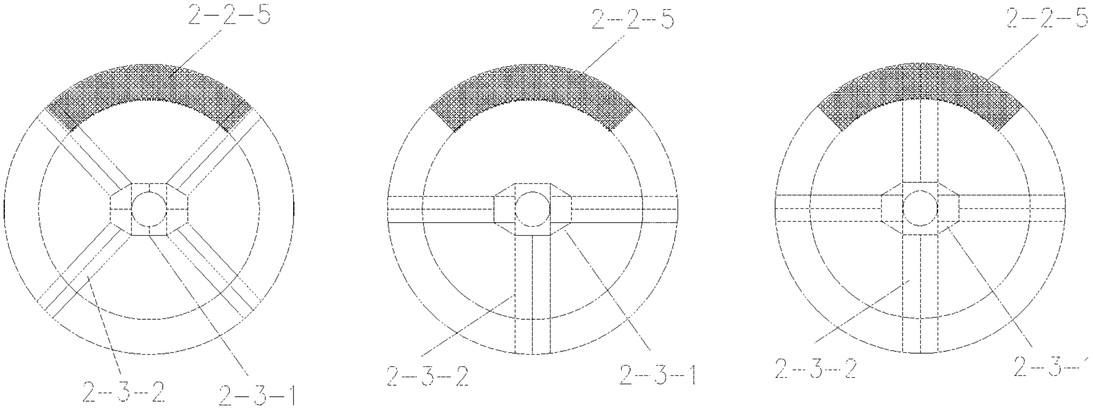
FIG. 3 is a schematic diagram of C-C cross-section of the pulverizing and drying device in FIG. 2.

As shown in FIG. 2, the pulverizing device 2-1 and the drying device 2-2 are integrated as a whole. A front end and a rear end of each device respectively correspond to the left and the right shown in FIG. 2. The rear end of the pulverizing device 2-1 is open, the front end of the drying device 2-2 is open, and the rear end of the pulverizing device 2-1 is connected with the front end of the drying device 2-2. The pulverized material directly enters the drying device 2-2 along the axial direction of the pulverizing main shaft and the drying main shaft. The center axes of the pulverizing main shaft 2-1-5 and the drying main shaft 2-2-3 are on the same straight line, and two main shafts are connected with each other by the shaft seat 2-3 (shared shaft seat 2-3). The shaft seat 2-3 comprises a support 2-3-1 and a shaft box 2-3-2 fixed on the support. The support 2-3-1 comprises two sub-supports with linear shape. The cross-section of the support 2-3-1 is perpendicular to the pulverizing main shaft shown in FIG. 3, the cross-section can be T-shaped, X-shaped, or a shape perpendicularly intersecting. The shaft box 2-3-2 accommodates both the pulverizing main shaft 2-1-5 and the drying main shaft 2-2-3, so as to ensure that the pulverizing main shaft 2-1-5 and the drying main shaft 2-2-3 rotate independently from each other.

Figure 4:
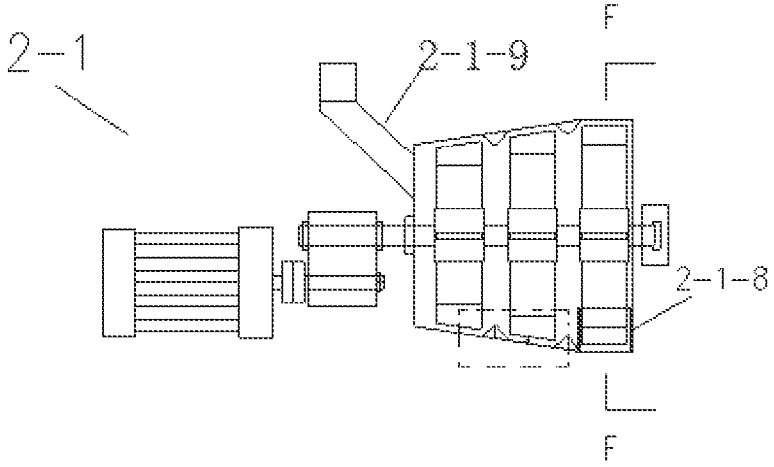
FIG. 4 is a structural diagram of an embodiment of a pulverizing device of the present application.
Figure 5:
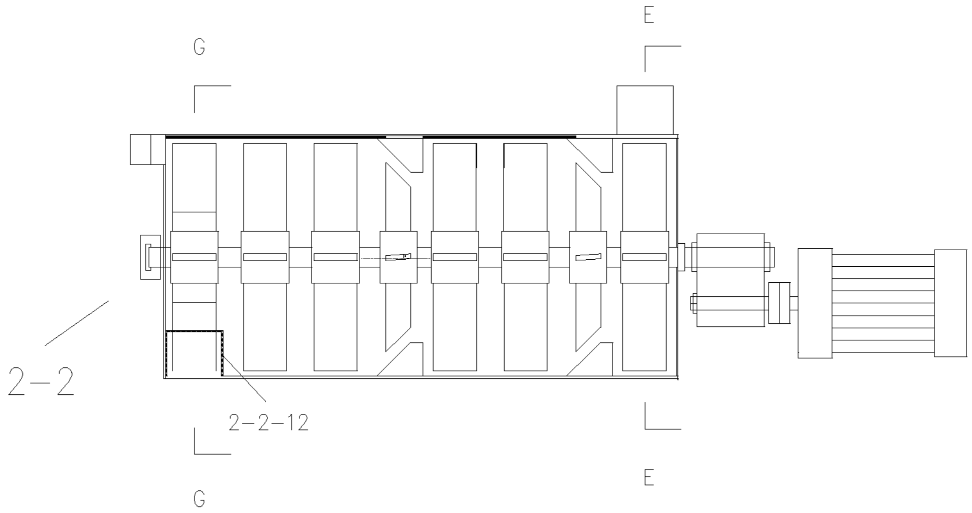
FIG. 5 is a structural diagram of an embodiment of a drying device of the present application.

As shown in FIGS. 4 and 5, the pulverizing device 2-1 and the drying device 2-2 are independent from each other. A front end and a rear end of each device respectively correspond to the left and the right shown FIGS. 4 and 5. The rear end of the pulverizing device 2-1 is closed, and the front end of the drying device 2-2 is closed. The pulverizing device 2-1 is communicated with the drying device 2-2 through a pipe.

A discharge port 2-1-8 is formed on the bottom of the rear end of the pulverizing device 2-1 (section F-F) along a tangential direction of the rotation of the pulverizing blades 2-1-6. The inlet Feb. 2, 2012 is formed on the bottom of the front end of the drying device 2-2 in a tangential direction opposite to the rotation direction of the drying blades (section G-G). The discharge port 2-1-8 of the pulverizing device is connected with the inlet Feb. 2, 2012 of the drying device. The pulverized material is discharged out of the pulverizing device 2-1 along the tangential direction of the rotation of the pulverizing blades 2-1-6, enters in the drying device through the inlet Feb. 2, 2012, and then is driven to move for drying by the drying blades 2-2-6.

Figure 6:
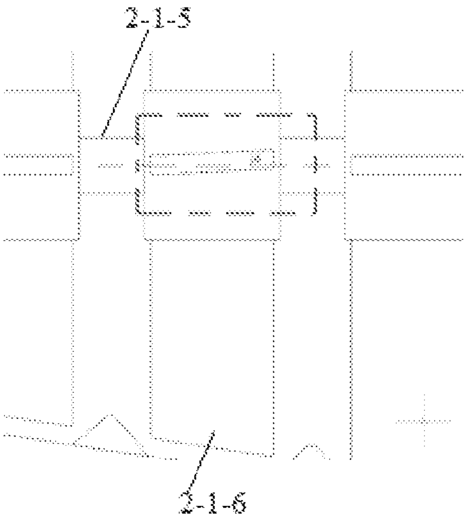
FIG. 6 is partial enlarged view of the pulverizing device in FIG. 2.
Figure 7:
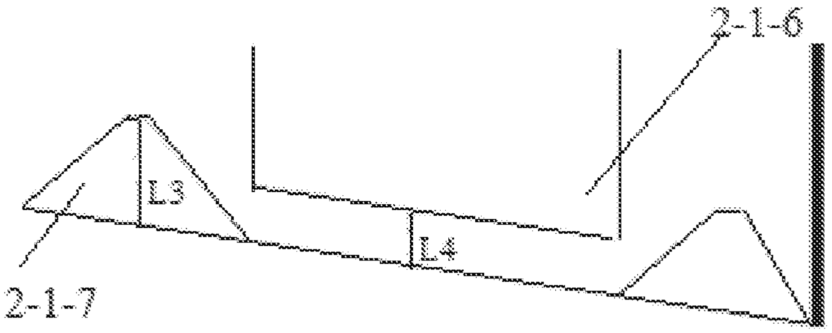
FIG. 7 is partial enlarged view of the drying device in FIG. 4.

With reference to FIGS. 2, 4, and 6, the pulverizing device 2-1 comprises: a driving motor 2-1-1, a speed reducer 2-1-2, a pulverizing shell 2-1-3 with a shape of truncated cone, a pulverizing main shaft 2-1-5 arrange in the pulverizing shell, and pulverizing impellers 2-1-6 attached on the pulverizing main shaft. The driving motor 2-1-1 drives the pulverizing main shaft to rotate through the speed reducer 2-1-2.

The pulverizing shell 2-1-3 with a shape of truncated cone comprises two circular end faces at the front end and the rear end, and a conical side surface connecting with the two ends. The front end is smaller than the rear end. A pulverizing inlet 2-1-4 is formed on the front end of the pulverizing shell 2-1-3 (section B-B), and is located above the pulverizing main shaft 2-1-5. During pulverizing, the material enters the pulverizing device from the front end and is discharged from the rear end or the side close to the rear end.

The inlet 2-1-4 of the pulverizing shell is connected with a conveying pipe 2-1-9, and the conveying pipe is configured to be gradually close to the pulverizing main shaft 2-1-5 in a direction from the front end to the rear end. As shown in FIG. 2, an outlet of the conveying pipe is connected with the pulverizing inlet 2-1-4 of the pulverizing shell. An inlet of the conveying pipe is higher than the outlet of the conveying pipe. When the materials enters in the conveying pipe from the inlet, slides down along the inclined pipe and enters the pulverizing inlet 2-1-4 of the pulverizing shell. The movement direction of the materials at the inlet of the pulverizing shell is towards the pulverization main shaft. Therefore, when the materials enters in the pulverization device, so the materials is subject to a small reverse force caused by pulverizing blades, and the materials can smoothly enter in the pulverization shell.

At least one pulverizing impeller 2-1-6 is provided along the pulverizing main shaft. Each of the pulverizing impellers comprises 2-8 pulverizing blades, and the pulverizing blades of one impeller are fixedly attached on the pulverizing main shaft in a same circumferential surface. The end of the pulverizing blade is oblique, so that the distance between the end of the pulverizing blade and the inner sidewall of the pulverizing shell 2-1-3 with a truncated cone can be basically kept the same in all positions, for example, the distance is in a range of 0.5-5 cm. The pulverizing blade is a shape of strip, of which the size in three dimensions is: length>width>height, wherein, the length is a direction perpendicular to the pulverizing main shaft, the width is a direction extending in the pulverizing main shaft, and the thickness of the pulverizing blade is the height. An included angle between the width direction of the pulverizing blade and the axial direction of the pulverizing main shaft is in a range of 0°-10°, preferably greater than 0° (refer to FIG. 6).

As shown in FIG. 2 and FIG. 6, an annular rib 2-1-7 is arranged on the inner sidewall of the pulverizing shell 2-1-3 with a truncated cone, and is located between adjacent pulverizing blades. In the axial direction, one annular rib can be arranged between every two pulverizing blades. Or it is also possible to partition two annular ribs by the pulverizing impellers with the number of 1 to n.

The cross-section of the annular rib can be a shape of triangular, trapezoidal, or arc. In a radial direction of the pulverizing shell, a thickness L3 of the annular rib 2-1-7 is greater than a distance L4 between the pulverizing blade 2-1-6 and the inner sidewall of the pulverizing shell 2-1-3 with a truncated cone (as shown in FIG. 6).

Referring to FIGS. 2 and 4, the drying device 2-2 comprises: a driving motor 2-2-1, a decelerator 2-2-2, a drying main shaft 2-2-3, and a drying shell 2-2-4 with a shape of cylinder. A drying impeller 2-2-6, a guiding impeller 2-2-7, and a push-flow impeller 2-2-8 are located in the drying shell and fixedly attached on the drying main shaft.

Each drying impeller 2-2-6, each guiding impeller 2-2-7, or each push-flow impeller 2-2-8 comprises a plurality of blades respectively. The blades are in a shape of strip, and the size of each of the blades in three dimensions is: length>width>height.

As shown in FIG. 2, the partition portion 2-2-9 is provided on the inner sidewall of the drying shell 2-2-4. A guiding impeller 2-2-7 is arranged in a space surrounded by the partition portion, that is, the guiding impeller 2-2-7 is set in a radial space where the partition portion 2-2-9 is located. The drying impeller 2-2-6 is arranged in a space between the partition portion and the front end/end of the drying shell 2-2-4, and/or arranged in a space between adjacent partition portions. A discharge port Feb. 2, 2010 is formed on the sidewall of the drying shell near the rear end. The push-flow impeller 2-2-8 is arranged in a radial space where the discharge port Feb. 2, 2010 is located, and a width of the discharge port is greater than the width of the push-flow blades in the axial direction.

Figure 8:
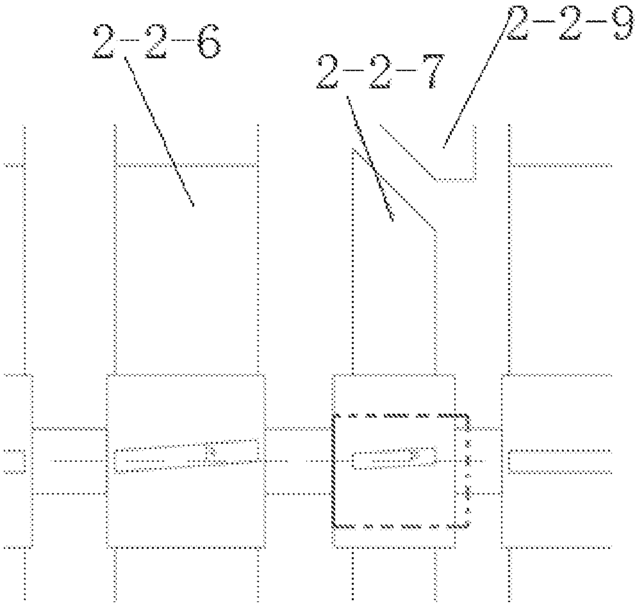
FIG. 8 is partial enlarged view of the drying device in FIG. 2.
Figure 9:
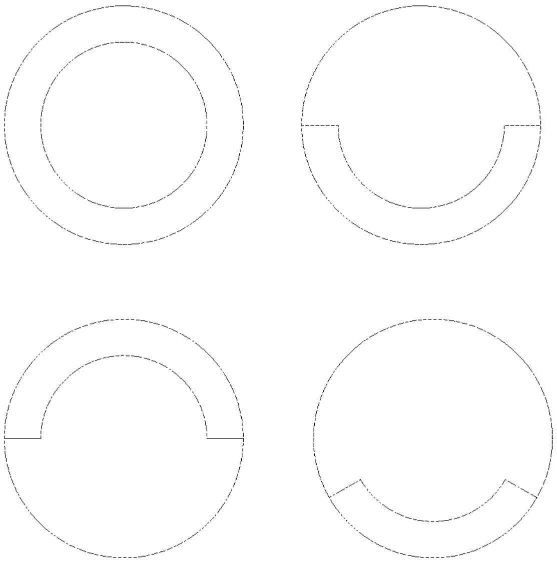
FIG. 9 is a schematic diagram of the D-D cross-section of the pulverizing and drying device of FIG. 2.

As shown in FIG. 2, the cross-section of the partition portion is a shape of a right triangle or a right trapezoid, and a hypotenuse of a right triangle or a hypotenuse of a right trapezoid faces the front end of the drying shell 2-2-4. The partition portion can be arbitrarily adjusted between ⅓ ring and full ring as required (as shown in FIG. 9). As shown in FIGS. 2 and 8, a first end of the guiding blade is fixed on the drying main shaft, and a shape of a second end opposite to the first end is inclined, so that distances between the second end of the guiding blade and the inclined surface of the partition portion can be basically same, and are in a range of 1.0 cm-8.0 cm. The guiding blade is arranged along an axial direction of the drying main shaft, and an included angle c between the guiding blade and an axial direction of the drying main shaft is in a range from 0° to 30°.

One or more drying impellers 2-2-6 are respectively arranged in a space between the partition portion and the front end/the rear end of the drying shell 2-2-4, and/or a space between adjacent partition portions. Each space constitutes a drying treatment unit, the drying device 2-2 comprises one or more drying treatment units.

The dried material in the drying shell 2-2-4 is discharged out of the drying device 2-2 through the discharge port Feb. 2, 2010 by the push-flow impeller 2-2-8 in the tangential direction of rotation.

Figure 10:
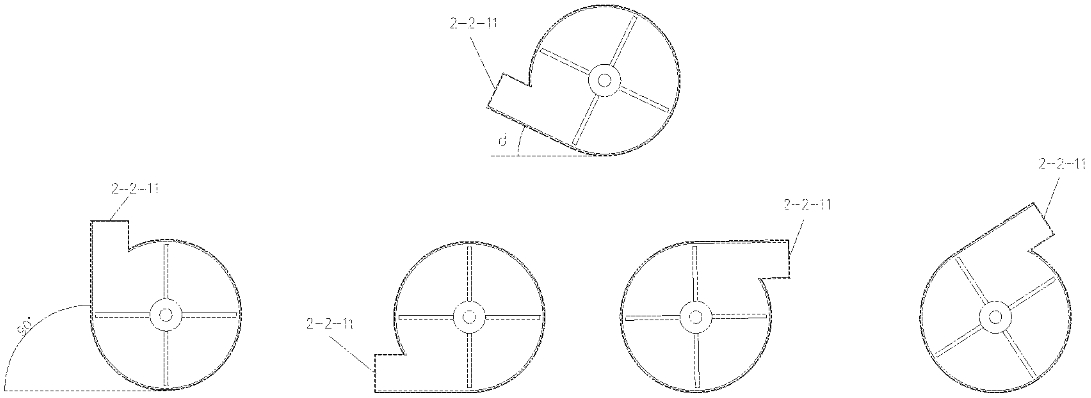
FIG. 10 is a schematic diagram of the E-E cross-section in the pulverizing and drying device of FIG. 2.

The discharge port Feb. 2, 2010 is formed on the sidewall of the cylindrical drying shell 2-2-4 near the rear end, and is in the tangential direction of the cylindrical drying shell 2-2-4. An included angle d between the discharge port Feb. 2, 2010 and a tangent to a bottom of the rear end of the cylindrical drying shell 2-2-4 is 0-180° (as shown in FIG. 10).

Figure 11:
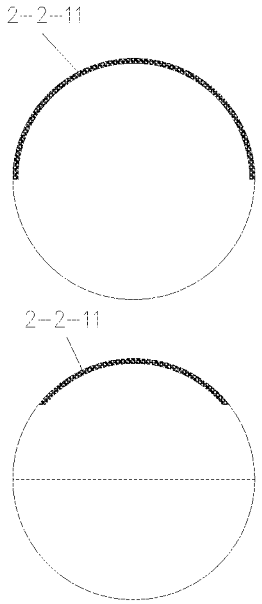
FIG. 11 is a side view of the drying device in FIG. 2.
Figure 12:
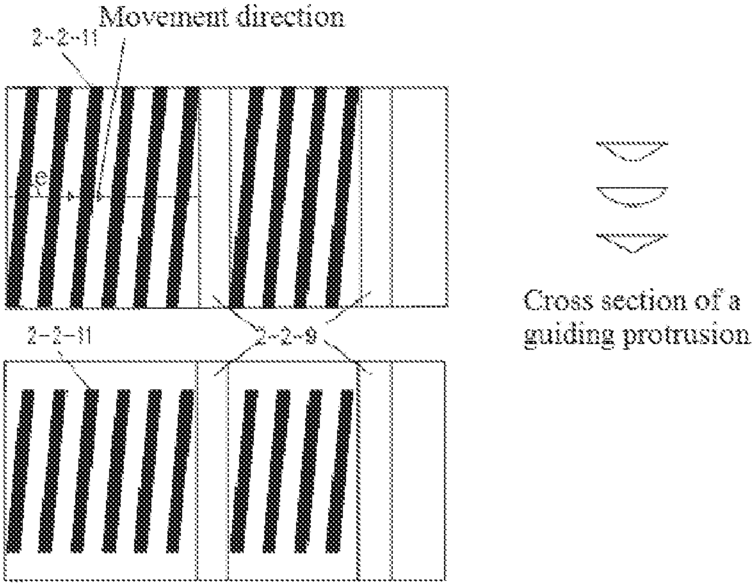
FIG. 12 is a top view of the drying device in FIG. 2.

An upper of the inner sidewall of the drying shell 2-2-4 is provided with guiding protrusions Feb. 2, 2011, as shown in FIGS. 11 and 12.

The guiding protrusions Feb. 2, 2011 are provided on a top of the upper of the inner sidewall of the drying shell 2-2-4, and are extended in a circumferential direction of the drying shell. The cross-section of the guiding protrusion is trapezoidal, triangular, or arc shape. In the axial direction of the drying shell, the guiding protrusions Feb. 2, 2011 are provided on ½ of the inner sidewall of the drying shell 2-2-4 and to the upper half sidewall of the drying shell. There is no guiding protrusion in the area where the partition portion is located. On projection plane in a horizontal direction (shown in FIG. 12), an included angle between the guiding protrusions Feb. 2, 2011 and the drying main shaft 2-2-3 is in a range of 60-88° (direction: from the front feed end with an inlet to the rear end with a discharge port of the drying shell). In the rotation direction of the drying impeller, the drying blade of the impeller first passes through a first end of the guiding protrusion, and then passes through a second end of the guiding protrusion, and a distance between the first end of the guiding protrusion and the front end of the drying shell is less than a distance between the second end of the guiding protrusion and the front end of the drying shell.

Like the arrangement of pulverizing blades, an included angle b between the drying blade of the drying impeller 2-2-6 and an axis direction of the drying main shaft 2-2-3 is in a range of 0-5° (FIG. 8). A distance between the end of the drying impeller and the inner sidewall of the drying shell 2-2-4 is in a range of 0.5-4 cm. The number of drying blades of each drying impeller is 2-10.

An air inlet 2-2-5 is formed at the upper of the front end of the cylindrical drying shell 2-2-4.

The material treated by the pulverizing and drying device passes through the gas-solid separation device to separate the gas from the solid.

Example 1

In the example, the sludge is dried in the drying equipment shown in FIG. 1.

The sludge with a moisture content of 54.5% is crushed into particles to be dried with a particle size≤5 mm. The particles to be dried enters the pulverizing device, and the particles to be dried is crashed and pushed to perform centrifugal motion under a rotation of pulverizing blades with a speed of 2500 r/min and pulverized into ultrafine powders with a size of 20-250 μm in the pulverizing device. The ultrafine powders enters into a drying device, and the ultrafine powders is dried to evaporate water to obtain dried powders under the action of dry air and a rotation of drying blades with a speed of 2500 r/min. The dried powders is fed into a gas-solid separation device for separating gas from solid powders, and the moisture content of the final separated solid powder is 26.3%.

What is claimed is:

1. A solid-liquid separation equipment, comprising:

a pulverizing and drying device comprising:

a pulverizing device; and a drying device, wherein the pulverizing device and the drying device are connected to one another or are independent from one another;

wherein the pulverizing device comprises:

a pulverizing shell;

a pulverizing inlet;

a pulverizing main shaft; and at least one pulverizing impeller;

wherein the pulverizing main shaft and the at least one pulverizing impeller are arranged in the pulverizing shell;

wherein the at least one pulverizing impeller is configured to rotate around the pulverizing main shaft;

wherein the pulverizing inlet is formed at an end of the pulverizing shell;

wherein the end of the pulverizing shell where the pulverizing inlet is formed intersects with the pulverizing main shaft or an extension line of the pulverizing main shaft;

wherein a gap is defined between an outer peripheral end of the at least one pulverizing impeller and a sidewall of the pulverizing shell;

wherein the pulverizing main shaft of the pulverizing shell is parallel to a horizontal direction, and the pulverizing inlet is located above the pulverizing main shaft in a vertical direction;

wherein the drying device comprises:

a drying shell with a shape of a cylinder;

an air inlet;

a discharge port;

a drying main shaft;

at least one drying impeller;

wherein the drying main shaft and the at least one drying impeller are arranged in the drying shell;

wherein the at least one drying impeller is configured to rotate around the drying main shaft;

wherein the air inlet and the discharge port are arranged on a sidewall of the drying shell;

wherein the drying shell includes a first end and a second end, wherein the air inlet is arranged closer to the first end than to the second end; and wherein the discharge port is arranged closer to the second end than to the first end.

2. The solid-liquid separation equipment according to claim 1, wherein, in a direction of the pulverizing main shaft, cross-sections of the pulverizing shell perpendicular to the pulverizing main shaft are variable, and wherein a cross-sectional area of the sidewall perpendicular to the pulverizing main shaft gradually increases in size moving in a direction from the end with the pulverizing inlet and towards another end of the pulverizing shell.

3. The solid-liquid separation equipment according to claim 2, further comprising:

a plurality of pulverizing impellers;

wherein the pulverizing shell is in a shape of a truncated cone; and an annular rib is provided on an inner surface of the sidewall of the pulverizing shell between adjacent pulverizing impellers of the plurality of pulverizing impellers and in the direction of the pulverizing main shaft.

4. The solid-liquid separation equipment according to claim 3, wherein a maximum length of the annular rib in a radial direction of the pulverizing shell is greater than a distance between the plurality of pulverizing impellers and the inner surface of the sidewall of the pulverizing shell.

5. The solid-liquid separation equipment according to claim 1, wherein a plurality of pulverizing impellers is provided in a direction of the pulverizing main shaft;

wherein each of the plurality of pulverizing impellers comprises 2-8 pulverizing blades;

wherein the pulverizing blades are arranged evenly; and wherein the pulverizing blades of one of the plurality of pulverizing impellers are evenly arranged around the pulverizing main shaft.

6. The solid-liquid separation equipment according to claim 5, wherein each pulverizing blade is configured to be in a shape of a strip, and an included angle between the pulverizing blade and an axis of the pulverizing main shaft is in a range of from about 0° up to about 10°.

7. The solid-liquid separation equipment according to claim 1, further comprising:

a conveying pipe, wherein the pulverizing inlet of the pulverizing shell is connected with an outlet of the conveying pipe; and wherein an inlet of the conveying pipe is arranged vertically higher than the outlet of the conveying pipe.

8. The solid-liquid separation equipment according to claim 1, wherein guiding protrusions are provided on an inner sidewall of the drying shell; wherein the drying main shaft is substantially parallel to the horizontal direction, and the guiding protrusions are provided on the inner sidewall of the drying shell not lower than the drying main shaft in a vertical direction;

wherein each of the guiding protrusions is extended in a circumferential direction of the inner sidewall of the drying shell; and wherein an included angle between the guiding protrusions and the drying main shaft is in a range of about 60-88° with respect to a projection plane in the horizontal direction.

9. The solid-liquid separation equipment according to claim 8, wherein the guiding protrusions are arranged on the inner sidewall of at least a first half of the drying shell and above the drying main shaft.

10. The solid-liquid separation equipment according to claim 1, further comprising a partition portion provided on an inner sidewall of the drying shell in a circumferential direction;

wherein the partition portion is arranged on the inner sidewall of the drying shell between adjacent drying impellers of the at least one drying impellers and in an extending direction of the drying main shaft;

wherein a guiding impeller is provided on a same cross-section as the partition portion, the partition portion comprises an inclined surface, and the inclined surface faces the first end of the drying shell; and wherein distances between the inclined surface of the partition portion and the first end of the drying shell are gradually increased in a radial direction moving from a center of the drying shell to the inner sidewall thereof.

11. The solid-liquid separation equipment according to claim 10, wherein the cross-section of the partition portion is in a shape of a trapezoid or a triangle.

12. The solid-liquid separation equipment according to claim 10, wherein in the circumferential direction of the drying shell, the partition portion is at least located on the inner sidewall and is greater than ⅓ of a circumference of the drying shell.

13. The solid-liquid separation equipment according to claim 10, wherein a plurality of partition portions is arranged on the inner sidewall of the drying shell in an axial direction, and the at least one drying impeller are arranged between adjacent partition portions of the plurality of partition portions.

14. The solid-liquid separation equipment according to claim 13, wherein the drying impeller comprises a plurality of drying blades, and each of the plurality of drying blades is of a strip shape.

15. The solid-liquid separation equipment according to claim 1, wherein the discharge port is arranged on the sidewall of the drying shell near the second end;

wherein a push-flow impeller is attached on the drying main shaft; and a rotation plane of the push-flow impeller is at least partially coincident with the discharge port in a direction perpendicular to the drying main shaft.

16. The solid-liquid separation equipment according to claim 15, wherein the push-flow impeller comprises push-flow blades having a strip shape; and wherein a length of each push-flow blade in an axial direction of the drying shell is less than or equal to a length of the discharge port.

17. The solid-liquid separation equipment according to claim 1, wherein the second end of the pulverizing device is closed, and a first discharge port is formed on a sidewall of the pulverizing shell near the second end thereof, the first discharge port is in communication with an interior of the pulverizing shell by way of a pipe, and the first discharge port is tangential to the sidewall of the drying shell and is extended in a rotation direction of a pulverizing blade;

wherein the first end of the drying device is closed, and a second inlet is formed on the sidewall of the drying shell near the first end, the second inlet is in communication with an interior of the drying shell by way of the pipe, and the second inlet is tangential to the sidewall of the drying shell and is extended in a direction opposite to a rotation direction of the drying blade; and wherein the first discharge port of the pulverizing device is connected with the second inlet of the drying device by way of the pipe.

* * * * *